Feb. 11, 1930.   D. S. HARRINGTON   1,746,699
APPARATUS FOR CURING VULCANIZABLE BANDS
Filed Oct. 19, 1927
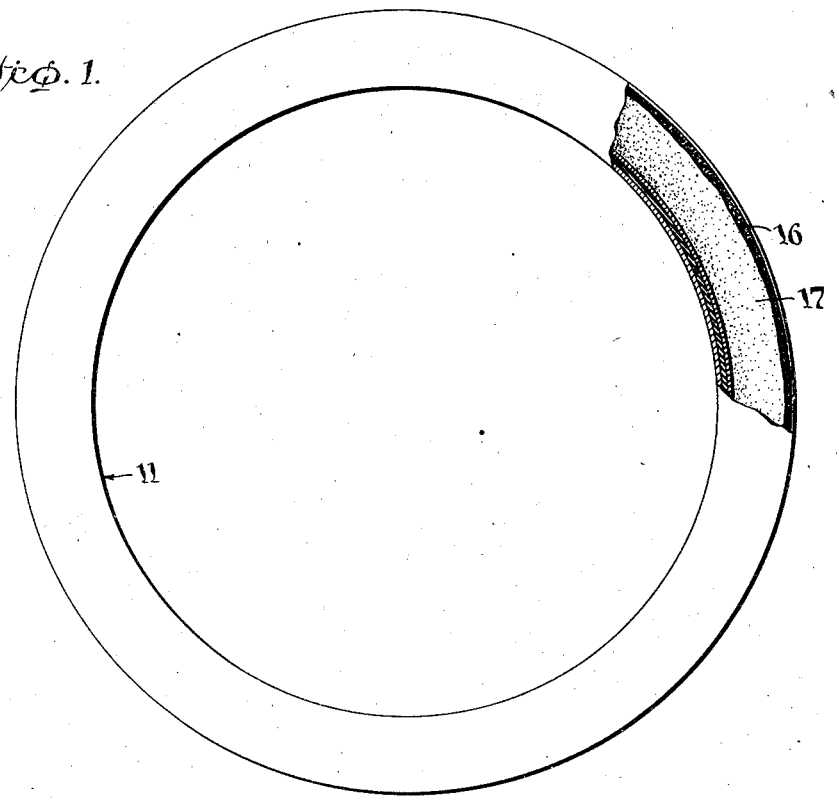
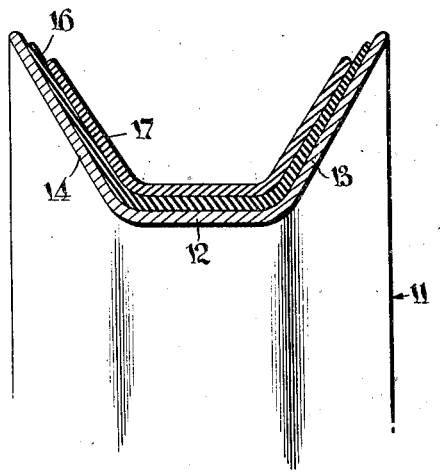
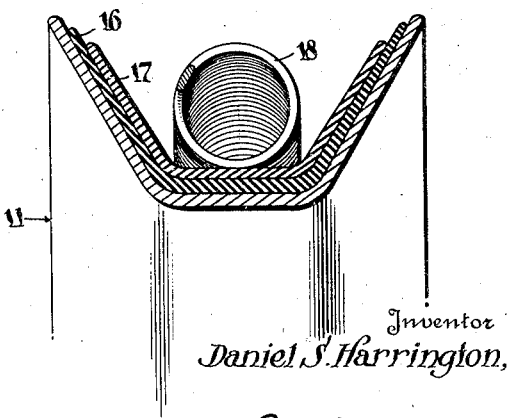
Inventor
Daniel S. Harrington,
By R. S. Trogner
Attorney Patented Feb. 11, 1930

1,746,699

UNITED STATES PATENT OFFICE

DANIEL S. HARRINGTON, OF ATLANTA, GEORGIA, ASSIGNOR TO THE GOODYEAR TIRE & RUBBER COMPANY, OF AKRON, OHIO, A CORPORATION OF OHIO

APPARATUS FOR CURING VULCANIZABLE BANDS

Application filed October 19, 1927. Serial No. 227,181.

The invention relates to vulcanizing apparatus for curing bands of rubber or other material, and has particular relation to an apparatus of the above designated character which shall be especially applicable for the purpose of curing flaps for service in pneumatic tire casings.

One object of the invention is to provide a relatively inexpensive apparatus for curing vulcanizable bands that will be suitable for employment in connection with relatively large heaters in which a plurality of articles may be cured simultaneously.

Another object of the invention is to provide an apparatus for so curing tire flaps as to shape them definitely and permanently to correspond to the configuration normally assumed by a flap in service in a tire casing.

Prior to this invention, tire flaps have been cured by an apparatus comprising an oppositely disposed pair of steam heated shoes between which consecutive lengths of flap material were cured. The cross-sectional configuration of a flap cured by this apparatus was relatively flat and when in service in a tire casing, longitudinal distortion of portions of the material of the flap resulted. If great care was not exercised during the insertion of the flap and the inflation of the inner tube of the casing folds or wrinkles were likely to occur in the flap which usually resulted in injury to the casing or the inner tube. Also when employing the apparatus referred to above, it was practically impossible so to move the consecutive lengths of material forwardly between the shoes as to avoid overcuring or undercuring portions of the material adjacent the ends of the consecutive lengths.

The invention comprises a curved metallic form upon a surface of which a vulcanizable band is adapted to be positioned. The configuration of the band supporting surface is similar to the configuration of a flap when in service in a pneumatic tire casing. A band of rubber or other suitable material is placed on flap material and is adapted to press it firmly against the curved metallic form. A spring or other suitable elastic element may be employed, if desired, to increase the pressure exerted by the band against the form.

For a better understanding of the invention, reference may now be had to the accompanying drawing, forming a part of this specification, in which:

Fig. 1 is a side elevational view, partly in section, of an embodiment of the invention, illustrating an endless metallic ring having a tire flap positioned thereon and an elastic band for pressing the flap against the ring;

Fig. 2 is a fragmentary cross-sectional view of the embodiment of the invention illustrated by Fig. 1; and Fig. 3 is a fragmentary cross-sectional view illustrating another form which the invention may assume.

In practicing the invention, an endless metallic ring 11 is employed, (see Figs. 1 and 2), which comprises a central relatively flat portion 12 and oppositely inclined portions 13 and 14 extending outwardly therefrom. A band of flap material 16 is adapted to be severed from a supply roll, (not shown) and positioned upon the ring with the opposite ends joined in any suitable manner to form a continuous band.

An endless band 17, of cured rubber or other suitable elastic material, is then positioned upon the flap 16, the band pressing the flap material firmly against the ring 11. The ring thereafter is placed in a suitable heater (not shown) and permitted to remain until the flap 16 has been cured to the required degree. The ring is then removed from the heater and the band 17 and flap 16 removed therefrom, after which another flap is positioned upon the ring, as described above.

In the embodiment of the invention illustrated by Fig. 3, the ring 11 is adapted to receive the flap 16 and the rubber band 17 as described in the embodiment of the invention illustrated by Figs. 1 and 2. In order to increase the degree of compression exerted by the band 17 upon the flap 16, an endless coil spring 18 is positioned on the ring externally of the band 17. The spring 18 increases the contraction of a central circumferential portion of the band 17 and consequently increases the radial force exerted by the edge portions of the band upon the flap material.

It is to be understood that a plurality of trucks (not shown) may be employed for loading thereon a plurality of rings 11 supporting rubber flaps. The trucks may be rolled alternately into the heaters and thus maintained in continuous operation.

From the foregoing description, it will be apparent that the invention facilitates the production of a more perfect article of manufacture than heretofore has been produced by the existing apparatus. Also the invention provides an increased adaptation of existing standard units of equipment.

Although I have illustrated but one form which the invention may assume and have described that form in detail, it will be apparent to those skilled in the art that the invention is not so limited but that various modifications may be made therein without departing from the spirit of the invention or from the scope of the appended claim.

What I claim is:

A device for curing vulcanizable bands comprising an externally grooved endless ring for supporting an uncured endless band and an endless elastic band similar in configuration to the first band for pressing the other, by its own contraction against the surface of the groove.

In witness whereof, I have hereunto signed my name.

Signed at Atlanta, in the county of Fulton and State of Georgia, this 14th day of October, 1927.

DANIEL S. HARRINGTON.